United States Patent [19]

Correll et al.

[11] Patent Number: 5,686,185
[45] Date of Patent: Nov. 11, 1997

[54] DISBONDMENT RESISTANT EPOXY POWDER COATING COMPOSITION

[75] Inventors: Glenn D. Correll, Birdsboro; Roy M. Berstler, Hamburg, both of Pa.

[73] Assignee: Morton International, Inc., Chicago, Ill.

[21] Appl. No.: 774,768

[22] Filed: Dec. 30, 1996

Related U.S. Application Data

[63] Continuation-in-part of Ser. No. 672,278, Jun. 28, 1996, abandoned.

[51] Int. Cl.$^6$ ............................ C08L 63/02; C08G 59/14
[52] U.S. Cl. ..................... 428/418; 523/428; 525/524; 525/526; 528/94; 528/98; 428/413; 427/386
[58] Field of Search ........................... 523/429; 525/528, 525/526; 528/94, 98; 428/413, 418; 427/386

[56] References Cited

U.S. PATENT DOCUMENTS

| | | | |
|---|---|---|---|
| 3,578,615 | 5/1971 | Moore et al. | 260/18 |
| 4,251,426 | 2/1981 | McClure et al. | 525/524 |
| 4,767,832 | 8/1988 | Marx | 525/523 |
| 5,387,442 | 2/1995 | Kroeger et al. | 427/521 |
| 5,407,978 | 4/1995 | Bymark et al. | 523/457 |

OTHER PUBLICATIONS

Ministry of Transportation, Ontario, *Cathodic Disbondment Test for Epoxy–Coated Reinforcing Bars, Laboratory Testing Manual, Test Method LS–420*, Jul. 1, 1994.

ASTM Standard G8–90, *Standard Test Method For Cathodic Disbonding of Pipeline Coatings*, Am. Soc. for Testing and Mats., Jul. 1990.

ASTM Standard A 775/A 775M–95a, *Standard Specification For Epoxy–Coated Reinforcing Steel Bars*, Am. Soc. for Testing and Mats., Jan. 1996.

H. Leidheiser, Jr. et al., *Some Substrate and Environmental Influence On The Cathodic Delamination of Organic Coatings*, Jour. of Coatings Tech., vol. 53, No. 672, pp. 77–84, Jan. 1981.

Houston Society for Coatings Tech., *Resurvey of Methods of Evaluating Cathodic Disbonding Resistance of Organic Coatings*, Jour. of Paint Tech., vol. 47, No. 604, pp. 57–64, May 1975.

D. Campbell et al., *An Investigation of the Cathodic Disbondment of Some Epoxy Powder Coatings, Polymeric and Paint Coatings*, Ch. 24, pp. 336–353, Apr. 1983.

M. Orton, *The Effectiveness of Cathodic Protection Under Unbonded Coatings On Pipelines*, Materials Performance, pp. 17–20, Jun. 1995.

J. Kellner, *Laboratory Evaluation of In–Ground Cathodic Disbondment of Pipeline Coatings*, Materials Performance, pp. 20–24, Sep. 1986.

United States Department of Transportation, *The Performance of Bondable and Nonbondable Organic Coatings for Reinforcing Bars In Solution And Cathodic Disbonding Tests*, Pub. No. FHWA–RD–94–103, Jan. 1995 (Abstract Only. No specific rebar coating formulations disclosed in this 148 page reference other than general type, i.e., "epoxy.").

Derwent Abstracts 76–80050X, "Powder Coating Process", Sep. 1976.

Primary Examiner—Frederick Krass
Attorney, Agent, or Firm—Steven C. Benjamin; Gerald K. White

[57] ABSTRACT

A thermosetting epoxy resin powder coating composition is provided that comprises an epoxy resin composed of a diglycidyl ether of bisphenol A, a curing agent composed of a bisphenol A encapped diglycidyl ether of bisphenol A, and a cure catalyst composed of an imidazole adducted to a diglycidyl ether of bisphenol A, in which the ratio of curing agent to epoxy resin is below 70% stoichiometry, and preferably between about 10% and 60% stoichiometry. The thermosetting epoxy resin powder coating composition not only exhibits the desired flexibility and fast cure speeds, but also exhibits superior adhesion and superior resistance to delamination and cathodic disbondment, preferably having cathodic disbondment values typically less than 4 mm radial disbondment, and preferably less than 2 mm radial disbondment. Such properties are highly advantageous for protective powder coatings used on rebars and pipelines. The marked improvement in adhesion combined with good flow out behavior provide the thermosetting epoxy resin powder coating composition with the ability to effectively adhere to steel strappings and other dirty, oily and scaly metallic substrates. The thermosetting epoxy resin powder coating composition also begins to cure at very low temperatures for acceptable oven bake times. This property is highly advantageous for protective and decorative powder coatings used on wood and other heat sensitive substrates.

40 Claims, No Drawings

DISBONDMENT RESISTANT EPOXY POWDER COATING COMPOSITION

This application is a continuation-in-part of U.S. patent application Ser. No. 08/672,278, filed Jun. 28, 1996, and now abandoned, which is included herein by reference in its entirety.

FIELD OF THE INVENTION

The present invention relates to epoxy resin powder compositions useful as thermosetting powder coatings. More particularly, the present invention relates to anticorrosive epoxy resin powder coatings exhibiting very rapid cure speeds on very low temperature cures, desired smoothness and flexibility after curing, and superior resistance to cathodic disbondment or delamination of the cured coating from the coated substrate. In an aspect of the invention, these powder coatings are used as protective coatings for steel reinforcing bars, steel pipelines, steel strappings, and other metallic substrates where it is preferred to use coatings having rapid cure speeds, flexibility after curing, especially with respect to metal substrates which may require bending after being coated, superior adhesion and superior resistance to cathodic disbondment or delamination. In another aspect of the invention, these powder coatings are used as protective and decorative coatings for wood products and other heat substrates where it is preferred to use coatings having rapid cure rates or low temperature cures so as to not damage or worsen the physical or chemical properties of the substrate during heat curing.

BACKGROUND OF THE INVENTION

Fusion bonded, solventless, epoxy resin powder coatings have been long used to protect steel and other metal structures against corrosion. In fusion powder coating processes, the dry, finely divided, free flowing epoxy resin powders are deposited on the structure, which may be hot or cold, and then either the heat supplied from the structure or from an external source fuses and cures the powders into a continuous film that is resistant to corrosion. Examples of fusion coating processes include fluidized bed, electrostatic spray, electrostatic fluidized bed, and hot flocking with or without electrostatic spray.

Corrosion protection in gas and oil steel pipework, that are either buried underground or submersed in seawater, is largely achieved by the combined action of epoxy powder coatings and cathodic protection. Cathodic protection involves applying a direct electrical current on the steel pipeline in such a manner that the steel becomes the cathode and an auxiliary electrode becomes the sacrificial anode which is subject to oxidation and corrosion. The moisture and salts in the earth or seawater serve as the conducting electrolyte. In this manner electropositive ions from moisture and salts remain held on the cathode and protect the structure from corrosion, while electronegative ions are deposited on the sacrificial anode which is oxidized and eventually replaced in an advanced state of oxidation. The nonconducting epoxy powder coatings are known to effectively reduce the electrical current requirements for cathodic protection of steel pipeline, since only a minimal amount of the steel surface is left uncoated and exposed, for instance, where the coating has been removed in transit or upon installation, and requires cathodic protection. Consequently, the cost associated with cathodic protection of epoxy powder coated steel pipeline is reduced to practical amounts to make it economically viable.

However, it is also known that imposition of a direct current potential on the steel structure during cathodic protection in the presence of moisture, oxygen and metal salts, such as may be experienced by submerged or buried pipework, can have detrimental effects on the protective coating. Wherever any voids, cracks or other discontinuities in the coating occur on the pipeline leaving an area of the underlying metal exposed to moisture and other corrosive elements, the applied current on the exposed pipework in the damaged area initiates a sequence of events that lead to loss of adhesion and disbondment or delamination of the protective coating from the metal, which is known as "cathodic disbondment", leaving a progressively greater area of the steel exposed to corrosive influence. This causes an increase in the electrical current demand or requires on-site repair of the damaged coating, both of which increase the cost of the cathodic protection.

The disbondment usually occurs in a radial pattern, starting from the discontinuous damaged area or coating defect. The extent of the disbondment can easily be evaluated by breaking the disbonded film away from the unaffected portion and measuring the radius of the disbonded circuit area. When a coating of good cathodic disbondment is used on the steel pipeline, the increase in current requirements over long periods is negligible. Therefore, epoxy powder coatings that have superior resistance to cathodic disbondment are continually being sought in the pipeline industry.

More recently, cathodic disbondment has become an important criteria in evaluating the performance of protective epoxy powder coatings on steel reinforcing bars, commonly known as "rebars". While corrosion protection of rebars is largely achieved by epoxy powder coatings without the use of cathodic protection, the rebar industry now evaluates an epoxy powder coating's adhesive properties and, thus, its ultimate ability to provide adequate corrosion protection in the field, under accelerated corrosion tests, including a test for cathodic disbondment. It is widely accepted that failure of epoxy rebar coatings during service in the field results from delamination or disbondment at the coating-steel interface, which, in turn, progressively exposes larger areas of the steel to corrosive attack. The cathodic disbondment test is thus used in the rebar industry to determine the degree of delamination of the coating under a standard set of experimental conditions in order to estimate the corrosion protective properties of the epoxy coatings during service in the field.

In cathodic disbondment test methods, such as ASTM Standard G8-90 used for epoxy coated pipeline and ASTM Standard A-775-95(a) used for epoxy coated rebar in the U.S. or Ministry of Transportation of Ontario (MTO) Laboratory Test Method LS-420 used for epoxy coated rebar in Canada, an epoxy powder coated rebar or pipeline specimen that is free from defects, such as voids, cracks, holidays, breaks or bare areas, is provided with a damaged site on the coating deep enough to expose the steel, for instance by drilling a hole having a set diameter through the coating. Next, the specimen with the damaged site is placed in an electrolyte solution, connected to an anode, and subjected to cathodic treatment for a set time. After the cathodic treatment, the specimen is removed from the electrolyte solution and with a sharp, thin-bladed knife, the coating that radially extends around the damaged site is lifted off with the knife blade and the radius of disbondment of the coating from the damaged site is measured.

Since July 1994 in Canada, rebar coaters have been required by the MTO to test all production epoxy powder rebar coatings for cathodic disbondment and to maintain a 90-day rolling average of less than 2 mm disbondment radius on greater than 95% of all readings. It is expected in the near future that the U.S. Department of Transportation will impose similar cathodic disbondment requirements on U.S. coaters of epoxy powder coated rebars. Currently in the U.S., rebar coatings must meet a prequalification requirement that specifies a maximum allowable disbondment radius of 4 mm under ASTM Standard A-775-95(a) cathodic disbondment test method.

Known commercial epoxy resin powder coatings are unable to consistently deliver a 2 mm or less cathodic disbondment radius without extraordinary cleaning techniques or pretreatment. In Canada, the rebar coaters have turned to adhesion promoting pretreatments, such as chromate conversion coatings, to improve the epoxy powder coating's adhesion and resistance to cathodic disbondment. The chromate conversion coatings, which comprise inorganic solutions of chromic acid, are typically rinsed over the rebar after grit blasting, and then the pretreated rebars are overcoated with the epoxy powder coatings. The pretreatment combination with the epoxy powder topcoat easily meets the cathodic disbondment requirements in Canada. However, such chromate conversion pretreatments are costly, and higher rebar coating costs cannot easily be passed to the purchaser in this industry, thereby reducing the desirability of expensive chromate pretreatments.

The pipeline industry has developed over the years many coatings having superior resistance to cathodic disbondment, especially since cathodic protection is used in service. These pipeline coatings consistently achieve less than 2 mm radius of disbondment. However, such formulations generally contain an inordinate amount of fillers in order to create coatings having impenetrable barriers to moisture and salts. The extremely high filler contents do provide better cathodic disbondment resistance but at the sacrifice of flexibility of the cured coating. Stiff pipeline coatings are not satisfactory for coating rebars which may require cold working, such as bending, after being coated. When subject to bending or other deformation forces, the inflexible pipeline coatings tend to craze and crack or otherwise fail, exposing the underlying steel to corrosive conditions, which is unacceptable for rebar epoxy powder coatings.

All known commercial flexible rebar epoxy powder coatings cannot deliver, on a consistent basis, cathodic disbondment values of less than 2 mm radial disbondment.

U.S. Pat. No. 5,407,978 (Bymark et al.) discloses a rapid curing thermosetting epoxy resin powder coating compositions having claimed increased flexibility for coating rebars. In Bymark et al., the powder coatings incorporate minor amounts of an aliphatic triepoxide to increase the flexibility after curing. The compositions are disclosed as containing from about 95 to 99 epoxide equivalent weight percent of an aromatic diepoxide epoxy resin composed of a diglycidyl ether of aromatic bisphenol A, from about 1 to 5 epoxide equivalent weight percent of an aliphatic triepoxide epoxy resin composed of a trifunctional polyglycidyl ether of an aliphatic polyol, a curing agent selected from the group of dihydric bisphenol A and mixtures of bisphenol A and endcapped diglycidyl ether of bisphenol A, a cure catalyst selected from the group of imidazoles and imidazoles adducts of glycidyl ethers of bisphenol A. Recent cathodic disbondment tests on epoxy powder coatings that are believed to be based on the teachings of Bymark et al. yield radical disbondment values, on average, of greater than 7 mm radius of disbondment, which is unacceptable.

Another example of a commercial epoxy resin powder coating presently sold for coating rebars in Canada and the U.S. (which "Prior Art" formulation is further described in the comparative examples found at the back of this specification) contains an epoxy resin composed of diglycidyl ethers of bisphenol A, a curing agent composed of a bisphenol A endcapped diglycidyl ether of bisphenol A, a cure catalyst composed of an imidazole adduct of diglycidyl ether of bisphenol A, an acrylic flow modifier, fumed silica, and pigments, in which the level of curing agent is held at 70% stoichiometry. These epoxy powder coatings when commercially coated on rebars without chromate pretreatments typically yield, on average, a cathodic disbondment radius of 4 mm or even greater. Therefore these epoxy powder coatings with 70% stoichiometry, will always require in practice a chromate conversion pretreatment in order to yield passing disbondment values of less than 2 mm radius about 95% of the time.

What is needed is an anticorrosive, rapid curing, flexible, epoxy resin powder coating composition exhibiting superior adhesion and superior resistance to cathodic disbondment or delamination that can be used on rebars, pipelines and other metallic substrates that require corrosion protection.

Surprisingly, the inventors of the present invention have found that reductions in the level of curing agent to below 70% stoichiometry, and preferably to below 60% stoichiometry, in the aforementioned composition provide epoxy powder coatings for rebars and pipelines with superior resistance to cathodic disbondment, consistently producing values of less than about 4 mm radial disbondment, and preferably less than about 2 mm radial disbondment. The reduction in the amount of curing agent unexpectedly is shown to increase the crosslink density of the cured powder coating. The increased crosslink density is believed to have a direct bearing on the improved performance in cathodic disbondment. Moreover, despite the increase in the crosslink density, the cured powder coating still exhibits the desired flexibility, allowing bending of the coated substrate without loss of adhesion and film fracture. Also, the improved powder coatings of the present invention exhibit increased cure speeds at high temperatures allowing applications at ultra fast coating line speeds.

In addition, the inventors of the present invention have surprisingly discovered that the aforementioned rapid cure, flexible, epoxy powder coatings of this invention having a reduced stoichiometry unexpectedly exhibit superior adhesion and resistance to disbondment or delamination even when coated on dirty, oily and scaly metallic substrates, such as steel strappings. In contrast to rebars and pipelines which are normally grit blasted and cleaned prior to powder coating, inexpensive steel strappings usually are not precleaned before coating and, consequently, contain oily and scaly residues on their coating surfaces. In the past, it has not been possible to adequately coat unclean steel substrates, such as steel strappings, with rapid cure, flexible, powder coatings on high speed coating lines. Fast cure powders tend to have poor adhesion when applied to marginally clean or unclean surfaces due to the presence of tighter crosslink networks produced with faster cure systems. Prior attempts to powder coat steel strappings with rapid cure powders have resulted in complete adhesion failures. Coaters of steel strappings, therefore, have primarily relied on waterborne liquid coatings to meet their coating needs.

Another factor working against being able to coat steel strappings with rapid cure powders is that the strappings are usually cold coated on high speed coating lines, whereas rebars and pipelines are normally powder coated when hot. Where a substrate is not preheated before applying rapid cure powders, it is more difficult to produce smooth film finishes. This is because the cure is so fast that during high temperature post heating, the powders do not have sufficient time to melt, flow out and level before the film hardens, which, in turn, causes undesirable surface roughness, such as orange peel or low gloss, detrimentally affecting the film quality and appearance. Yet, the rapid cure, flexible, epoxy powder coating of this invention having a reduced stoichiometry also unexpectedly produce coatings having the desired smoothness in the hardened film finishes, while still maintaining the rapid cure rates suitable for high speed coating lines.

What is further needed is an anticorrosive, rapid curing, flexible, epoxy powder coating composition that exhibits superior adhesion, superior resistance to disbondment or delamination and also the desired smoothness, even when cold sprayed on oily and scaly metallic substrates, such as steel strappings.

Furthermore, the inventors of the present invention have surprisingly discovered that the improved epoxy powder coatings of this invention can cure at extremely low temperatures for acceptable oven bake timers. This led the current inventors to investigate the use of the powder coatings of this invention for coating heat sensitive substrates, such as wood, where excessive exposure to heat during heat curing tends to damage the substrate. For wood substrates, in particular, powder coatings are being sought that can effectively melt, flow and cure at very low temperatures and/or very rapid rates in order to limit the amount of exposure of the substrate to potentially damaging heat.

In the past, powder spray coating such as electrostatic spraying has been problematic for coating of heat sensitive materials, such as wood, paper, cardboard and plastic substrates, since the curing takes place at rather high temperatures, usually greater than 350° F., for extended baking times, usually greater than 10 minutes. Such cure conditions are made necessary by the inherent high curing temperatures of conventional powder coatings and having to maintain these high temperatures for a period of time to achieve the desired cure. Heat sensitive materials generally cannot withstand such high temperatures for a continuous time necessary for powder coatings without being damaged. For instance, the resinous binders and moisture that maintain the integrity of wood products, such as particle board or fiber board, tend to degrade and volatilize at temperatures required for curing powder coatings at acceptable rates. It is an established industry belief that maximum heat exposure allowable for particle board or medium density fiber board is 350° F. for 6 minutes before degradation occurs.

U.S. Pat. No. 5,387,442 (Kroeger et al.) discloses a method of electrostatic spray coating heat sensitive materials, such as plastic materials, wood, paper, cardboard, leathers and textiles with thermosetting powder paint compositions, which method is based on short repetitive cycles of high intensity infrared heating that are interspersed with cooling cycles. In this way, it is claimed that the heat necessary for causing melting, film formation and subsequent curing of the top powder coat does not have time to attack the heat sensitive material of the substrate in a damaging or worsening way, since the heat is rapidly dissipated during the cooling intervals. However, this method fails to teach how to avoid using thermosetting powder coatings having inherent higher temperature cure and/or slower cure rate requirements altogether when coating heat sensitive materials. In Kroeger et al., it is shown that the substrate sees temperatures on the average of about 390° F. for about 20 minutes to cure the powder coatings.

What is also needed is a very low temperature curing and/or very rapid curing epoxy resin powder coating composition that can be used on heat sensitive materials, such as wood products, without causing degradation of the heat sensitive substrate during heat curing.

SUMMARY OF THE INVENTION

It is an object of the present invention, therefore, to provide thermosetting epoxy resin powder coating compositions that exhibit superior resistance to cathodic disbondment when coated and cured on rebar, pipeline and other metallic substrates.

It is another object of the present invention to provide epoxy powder coatings that exhibit the desired flexibility after curing to a thermoset condition, allowing the coated rebar, pipeline, or other metallic substrates to be bent or otherwise deformed after being coated without the film fracturing and cracking.

It is still another object of the present invention to provide epoxy powder coatings that exhibit rapid cure speeds, allowing the powder to melt, flow, and subsequently cure at increased coating line speeds without detracting from the surface smoothness of the hardened film finishes.

It is a feature of the present invention to significantly reduce the stoichiometry level of the curing agent in the epoxy powder coating which unexpectedly yields a higher crosslink density in the cured coating without the loss of flexibility, resulting in improved cathodic disbondment resistance which is believed to correlate to improved adhesion and improved corrosion performance in the field.

It is still another object of the present invention to provide an epoxy powder coated rebar, pipeline or other metallic substrate that has superior adhesion, resulting in superior resistance to cathodic disbondment.

It is a related object of the present invention to provide epoxy powder coatings that not only have the aforesaid flexibility and rapid cure speeds, but also that exhibit superior adhesion and superior resistance to disbondment or delamination along with desired surface smoothness despite being cold coated and cured on oily and scaly steel strapping and other unclean metallic substrates.

It is still another object of the present invention to provide an epoxy powder coated steel strapping or other unclean metallic substrate that has superior adhesion and the desired smoothness despite being rapidly cured without preheating.

It is a related object of the present invention to provide epoxy powder coatings that exhibit very rapid cure speeds and/or very low temperature cures allowing coating on wood and other heat sensitive substrates without subjecting the heat sensitive substrate during heat curing to excessive heat that can damage or worsen the properties of the coated substrate.

It is yet another object of the present invention to provide an epoxy powder coated wood or other heat sensitive substrate that is not exposed to excessive heat and thus is not damaged during heat curing.

These and other objects, features and advantages of the invention which will become apparent from the following description.

The present invention resides in a thermosetting epoxy powder coating composition, which is a composition in particulate form that comprises a blend of: (a) an epoxy resin, for example, a diglycidyl ether of bisphenol A; (b) a phenolic curing agent for said epoxy resin, for example, a bisphenol A endcapped diglycidyl ether of bisphenol A; and, (c) a cure catalyst, for example, an imidazole or an imidazole adduct with a diglycidyl ether of bisphenol A, in which the stoichiometry of said curing agent to said epoxy resin is provided in an effective amount below 70% stoichiometry, and, preferably at or below 60% stoichiometry, and, even more preferably, between about 10% and about 60% stoichiometry, to provide a rapid curing and/or low temperature curing, flexible, smooth, powder coating that exhibits superior adhesion and superior resistance to disbondment, delamination and deadhesion, for example, having a cathodic disbondment resistance of less than 4 mm radial disbondment, and preferably less than 2 mm radial disbondment. The composition can be applied and cured at rapid speeds on precleaned metallic substrates, such as rebars, and on oily and scaly metallic substrates, such as steel strappings. The composition can also safely be applied and cured at low temperatures on heat sensitive substrates, such as particle boards and medium density fiber boards.

DETAILED DESCRIPTION OF THE PREFERRED EMBODIMENTS OF THE INVENTION

Throughout this specification, all parts and percentages specified herein are by weight unless otherwise stated.

The thermosetting powder coatings of the invention contain an epoxy resin component. The epoxy resins useful in the thermosetting powder coatings of this invention are solid resins which are the reaction products of a dihydric alcohol and a halohydrin. Suitable epoxy resins useful in the practice of this invention are exemplified by, but are not limited to, the resins produced by reacting a dihydric phenol, such as bisphenol A, and epichlorohydrin and, if desired, further reacting the resultant diglycidyl ether of bisphenol A with additional bisphenol A to extend the chain length. These epoxy resins are commonly referred to as diglycidyl ethers of bisphenol A. Preferred epoxy resins include those sold under the trademark Araldite® GT 7013 and Araldite® 7074 by Ciba-Geigy Corporation, both of which are diglycidyl ethers of bisphenol A.

Bisphenol A is the most commonly used dihydric phenol when forming the diglycidyl ether epoxy resins derived from dihydric phenols. However, other suitable epoxy resins include the diglycidyl ethers of bisphenols B, F, G, H, and S.

Another class of epoxy resins useful in the present invention is the epoxidized novolacs, such as the epoxy cresol-novolac and epoxy phenol-novolac resins. The epoxy cresol-novolac resins are prepared by glycidylation of o-cresol-formaldehyde condensates with epichlorohydrin. Examples of epoxy cresol-novolac resins include those sold under the trademarks Epon 164 Resin by Shell Chemical and ECN 1280 or ECN 1299 by Ciba Geigy. The epoxy phenol-novolac resins are similarly prepared by glycidylation of phenol-formaldehyde condensates with epichlorohydrin. Examples of epoxy phenol-novolac resins include those sold under the trademarks EPN 1180 by Ciba Geigy and Epiclon N-770 by Summit Specialty Chemicals.

The epoxy resin component useful in the present invention can also be selected from a number of other well known classes of epoxy resins, such as those derived from non-benzoid materials, such as aliphatic or cycloaliphatic dihydric alcohols. These resins include the aliphatic or cycloaliphatic diglycidyl ether-type epoxy resins.

The present invention is not limited to the aforesaid epoxy resins which are intended to be purely exemplary of the invention, since a wide variety of well known epoxy resins can be used.

Still epoxy resins that are digylcidyl ethers are preferred, with the diglycidyl ethers of bisphenol A being especially preferred.

The epoxy resin component of the thermosetting powder coating composition has a weight per epoxide (WPE) range between about 650 and 2,000, preferably between about 700 and 2,000, more preferably between about 700 and 1,200, more preferably between about 900 and 1,200, and even more preferably between about 1,000 and 1,100. When mixtures of epoxy resins are employed in the epoxy resins component, the weight per epoxide of some of the individual epoxy resins will vary, but the weight per epoxide of the mixture, i.e., the weighted average of weight per epoxide of the individual resins, should fall within the foregoing range.

The thermosetting powder coatings of the present invention also contain a curing agent component. The curing agents useful in the thermosetting powder coatings of this invention are solid resins that possess at least two terminal hydroxy groups. Suitable curing agents useful in the practice of this invention are exemplified by, but are not limited to, phenolic curing agents, such as a bisphenol A endcapped diglycidyl ether of bisphenol A, which is the reaction product of a diglycidyl ether of bisphenol A and bisphenol A. Examples of preferred phenolic curing agents for the epoxy resin component includes those sold under the trademarks D.E.H.™ 87 and D.E.H.™ 85 by Dow Chemical Company, both of which are believed to be bisphenol A endcapped diglycidyl ethers of bisphenol A.

Other classes of phenolic hardeners can used as well such as phenol- and cresol-novolac curing agents sold by Georgia Pacific, Reichhold Chemicals and Ciba Geigy.

The curing agent component of the thermosetting powder coating composition has a hydroxy equivalent weight (HEW) ranging between about 180 and 1,000, preferably between about 200 and 450, more preferably between about 350 and 450, and even more preferably between about 370 and 400. The curing agent is used in an effective amount in the thermosetting powder coating to improve the coating's adhesion to the substrate and to reduce the amount of cathodic disbondment to levels generally below about 4 mm radial disbondment, and preferably below about 2 mm radial disbondment, without the need for extraordinary cleaning techniques or pretreatments.

Surprisingly, the inventors of the present invention have discovered that an improved thermosetting epoxy resin powder coating exhibiting superior adhesion and superior resistance to cathodic disbondment can be provided using reduced levels of curing agent as compared to the current 70% stoichiometry curing agent level for commercial epoxy powder coatings. At such reduced levels of curing agents, the epoxy powder coating composition of the present invention provides a coating that not only exhibits the desired flexibility after cure and increased cure rates, but also has superior resistance to loss of adhesion, delamination and disbondment. These improved properties can be demonstrated under accelerated cathodic disbondment corrosion tests, which tests are not being used in the industry to appraise the ultimate adhesive properties of commercially coated epoxy powder coatings over rebars and pipelines.

The current inventors have shown that starved levels of curing agent unexpectedly increase the modulus and crosslink density of the cured coating. While not wishing to be bound by theory, it is believed that the increase in crosslink density has a direct bearing in the improved performance in cathodic disbondment tests. It is further believed that the cured coating is now less permeable to the passage of water, salts, and oxygen through the coating to the coating-substrate interface, thereby reducing the exposure of the substrate at the interface to lower amounts of these corrosive elements, which in combination with normal potentials or applied cathode potentials tend to cause loosening, delamination, or disbondment of the coating and ultimate corrosion of the substrate. The starved levels of curing agent also unexpectedly reduce the gel time of the coating, leading to faster cures, while still remaining good flow out behavior at high temperatures to allow the coating to flow and level to the desired surface smoothness on high speed coating lines before curing.

The inventors have also surprisingly discovered that the improvements made in the adhesion of the reduced stoichiometry epoxy powder coating of this invention give the cured powder the ability to adhere to unprepared, dirty, oily and scaly substrates, such as steel strappings, despite the increase in the crosslink density.

The curing agent to epoxy resin ratio is normally calculated in terms of percent stoichiometry. To calculate the parts per hundred epoxy resin (phr) of curing agent in the thermosetting powder coating composition at a desired % stoichiometry level, both Equations (1) and (2) listed below are used.

$$(100 \text{ Phr Epoxy Resin})/(\text{Weighted Average WPE}) = x \text{ Epoxide Equivalents} \quad (1)$$

$$(\text{HEW})(x \text{ Epoxide Equivalents})(Y \text{ \% Stoichiometry}) = z \text{ Phr Curing Agent} \quad (2)$$

In the present invention, the inventors have found that the reduced level of curing agent is below 70% stoichiometry, and preferably at or below about 60%, and generally ranging between about 10 and 60% stoichiometry, and preferably between about 10 and 55% stoichiometry, and more preferably between about 15 and 50% stoichiometry, even more preferably between about 20 and 50% stoichiometry and even more preferably between about 20 and 35% stoichiometry, and even more preferably between about 25 and 35% stoichiometry. In these ranges, the crosslink density of the thermosetting powder coating is shown to increase together with its resistance to cathodic disbondment.

The thermosetting powder coating composition of the invention also contains a cure catalyst component. The cure catalysts useful in the thermosetting powder coatings of this invention include, without limitation, imidazoles, such as 2-methylimidazole and 2-phenylimidazole, and imidazoles adducts, especially 2-methylimidazole adducts, of polyglycidyl ethers, especially diglycidyl ethers, of bisphenol A. The imidazole residue typically comprises between about 5 and 50 wt. % of the imidazoel/bisphenol A type epoxy resin adduct composition. Preferred imidazole adducts are sold under the trademark Epon Curing Agent® P-101 by Shell Chemical Company and under the tradename HT 3261 by Ciba-Geigy Corporation, which are both believed to be an imidazole adduct with a diglycidyl ether of bisphenol A.

The cure catalyst is used in the thermosetting powder coating of the invention in an amount ranging between about 1 and 10 phr, and preferably between about 5 and 7 phr, although higher or lower amounts are not excluded. However, at cure catalyst levels below about 3 phr, the cure speed is too slow for commercial high speed coating lines, even at high temperatures, although such levels could be useful where speed is not necessary. Also, above 10 phr cure catalyst, the cure speed is too fast and does not allow sufficient time for the powder coating to sufficiently flow and level before curing, leaving a discontinuous film.

It is believed that the use of imidazole adducts as the cure catalyst allow the cure of the thermosetting powder coating to proceed at significantly increased cure speeds and/or at significantly reduced bake temperatures. Rapid cure speeds allow the coating line speed to be increased, thereby increasing the efficiency of the coating operation. This is particularly advantageous when coating heat resistant substrates, such as rebar, pipework, steel strapping, and other metallic substrates which are normally coated at high temperatures on rapid cure coating lines. Rapid cure speeds or lower cure temperatures also allow the powder coatings to be used on heat sensitive substrates, such as wood products, without exposing the substrate to excessive heat which tends to deteriorate the integrity of the heat sensitive material.

In addition to the aforementioned components, the thermosetting powder coating composition of this invention may also contain conventional powder coating additives, such as dyes, pigments, fillers, flow modifiers, leveling agents, anti-cratering agents, and the like. For example, pigments may be added to the powder coating composition should a colored coating be desired. Pigments are typically used in an amount up to about 60 phr. However, pigment loadings can vary depending on the desired opacity of the dry film.

A powder flow modifier of fumed silica may also be employed in the thermosetting powder coating of this invention. Fumed silica is typically present in amounts up to about 4 phr, and preferably ranging between 2 and 4 phr. A preferred fumed silica is sold under the trademark Cab-O-Sil® by Cabot Corporation. Another powder flow modifier that may be included in the thermosetting powder coating of this invention are acrylic flow modifiers, which are composed of acrylic resins. A preferred acrylic flow modifier is typically provided in a master batch containing about 90 wt. % diglycidyl ether of bisphenol A epoxy resin and 10 wt. % acrylic flow modifier, which master batch is sold under the trademark Araldite® GT 7226 by Ciba-Geigy Corporation. The acrylic flow modifier is typically used in an amount up to about 2 phr, and more preferably ranging between about 0.6 and 1.2 phr in the thermosetting powder coating composition of the invention.

Fillers (other than fumed silica) are generally not incorporated in rebar and steel strapping powder coating formulations, since fillers undesirably increase the stiffness and thus reduce the flexibility of the cured coatings. However, in pipeline powder coating formulations, especially for straight pipeline sections where flexibility is not as important, fillers may be employed. It is known that fillers enhance resistance to cathodic disbondment when incorporated in pipeline coatings. Furthermore, fillers may also be employed in wood and heat sensitive coating formulations again where flexibility is not as important. Examples of fillers include, without limitation, calcium carbonate, barium sulfate, mica, china clay, mixed silicates, and the like. In pipeline and wood powder coating formulations, the fillers may be employed in an amount up to about 100 phr, and preferably up to between about 50 and 60 phr.

The thermosetting powder coating compositions of this invention are prepared by conventional techniques employed in the powder coatings art. Typically, the components of the powder coating formulation are thoroughly blended together via medium to high intensity mixing and then melt blended in an extruder. Melt blending is generally carried out in the temperature range of between about 200° and 270° F. with careful control of the extruder temperature to minimize any curing and gelation from taking place in the extruder. The extruded composition, usually in sheet form after cooling, is broken into chips and then ground in a mill to a powder and subsequently screened to achieve the desired powder particle size.

The aforesaid thermosetting powder coating composition of the present invention exhibits superior adhesive properties, as demonstrated by having superior resistance to cathodic disbondment, together with desired flexibility and very rapid cure speeds. These properties provide a powder coating that can be readily applied, especially by electrostatic powder spraying, to rebars, pipelines and other metallic substrates, some of which may require cold working after being coated. The superior adhesive properties of this invention provide the ability to adhere to even oily an scaly surfaces, such as those encountered on steel strappings and other marginally clean metallic substrates. Moreover, electrostatic application of the powder over cold steel strappings combined with high speed curing is not problematic for the aforesaid powder coating composition, since the powder still has sufficient time to flow out and level to a smooth film before curing, thereby exhibiting the desired smoothness even when cold sprayed. The thermosetting powder coating of the present invention is also found to be particularly useful when applied, especially by electrostatic powder spraying, to heat sensitive substrates, such as wood products, since the powder coating exhibits very low temperature cure properties and/or very rapid cure rates, thereby limiting the substrate's heat exposure so as to not cause damage, such as embrittlement or loss of integrity, to the heat sensitive material.

The cure time/temperature range of the thermosetting powder coatings of this invention is found to be from about 2.5 seconds at about 550° F. down to about 30 seconds at about 400°–450° F. peak substrate temperature and further down to about 20 minutes at about 180°–200° F. peak substrate temperature.

The powder coating composition of this invention can be applied to the substrate and cured thereon using standard techniques employed in the powder coating art. For example, in rebar, pipeline and other heat resistant metal substrate powder coating operations, the metal substrate is usually preheated to between about 390° F. and 420° F. The substrate is then electrically grounded and conveyed on a horizontal line through a electrostatic spray coating station. A powder coating is then electrostatically applied onto the substrate while the substrate is suspended in the spray station. Typically a plurality of corona discharge electrostatic spray guns, as are well known in the art, are used to apply the powder coating to the substrate.

In corona spray guns, the free flowing powder coating particles are passed in a carrier gas stream through a corona discharge in the corona spray gun, and charge is transferred from the ionized discharged air molecules to the powder particles, whereby the powder particles becomes electrostatically charged. After electrostatic charging, the powder particles are ejected as a cloud through the spray gun nozzle by virtue of their charge and output carrier gas pressure to the vicinity of a grounded target substrate. The charged spray particles are attracted to the grounded substrate by virtue of the difference in their respective charges. This causes the particles to deposit as a uniform powder coating on the substrate, covering the entire substrate including faces and edges.

The residual heat in the preheated metal substrate causes the powder coating to melt, flow and cure to a continuous, flexible, anticorrosive, dry film.

The use of thermosetting powder coatings with rapid cure speeds is particularly advantageous in the present invention, since the coating line speed and overall efficiency of the coating operation can be increased with increased throughput. In commercial rebar and pipeline coating operations, the melt, flow and cure time should preferably take between about 20 and 40 seconds at the aforesaid elevated preheat temperatures.

After cure, the metal substrate is conveyed to a water spray station where it is water quenched down to a temperature of between about 200° F. and 240° F., and then conveyed to a drying area and left to air cool to room temperature. Rebar coatings are usually coated with an effective amount of powder coating to produce a dry film thickness of between about 7 and 11 mils thick. Pipeline coatings usually have a dry film thickness of between about 12 and 16 mils thick.

The powder coating composition of this invention can be applied to steel strappings, electrical wire conduits, and other metallic substrates which are not precleaned prior to coating, using a similar method to that identified above for rebars and pipelines. However, steel strappings are not subject to preheating prior to the electrostatic application and, therefore, must be postheated to melt, flow and cure the powder into a continuous, smooth, flexible, hardened film finish. For example, in coating steel strappings, the cold, i.e., ambient, substrate is grounded and conveyed on a high speed coating line through the powder spray station, where the powder is electrostatically applied, either with corona guns or electrostatic fluidized bed, over the substrate and uniform deposited thereon.

The charged powder adheres to the substrates as the substrate is rapidly conveyed on the high speed coating line through high temperature ovens, such as convection, infrared, or combination ovens, to melt, flow out and form a smooth hardened film on the steel strapping. In commercial high speed steel strapping coating lines, the melt flow and cure time usually ranges between about 1 and 5 seconds at a peak substrate temperature ranging between about 500° and 550° F.

Next, the cold coated substrate is conveyed to a water quench to lower the temperature to between about 200° F. and 240° F., which is followed collection of the coated strapping on a take up reel. Steel strappings are usually coated with an effective amount of powder coating to produce a dry film thickness of between about 0.5 and 2.0 mils thick or greater.

In another example, in powder coating wood and heat sensitive substrates, it is desired to avoid excessive exposure of the heat sensitive substrate during heat curing, requiring thermosetting powder coating compositions that either exhibit very low temperature cure properties for acceptable cure times or rapid cure rates at elevated temperatures. Heat sensitive substrates include, without limitation, wood, such as, hardwood, hard board, particle board, medium density fiber board (MDF), electrically conductive particle board (ECP), for example, ECP 35 sold by Boise Cascade, masonite board, or other wood products, and plastic, paper, cardboard, and composites and components with a heat sensitive aspect, and the like. Wood substrates having a moisture content of between about 3 and 10 wt. % are particularly suitable for electrostatic spraying. The wood substrates and heat sensitive substrates, which usually are relatively nonconductive, can be pretreated with conductive coatings, as are well known in the art, to enhance electrostatic sprayability.

In the powder coating operations for heat sensitive substrates, the substrate to be coated, such as a wood article, is supported and moved on a grounded conveyor line that extends through a powder spray station of an electrostatic spray coating apparatus. Either a horizontal line or vertical line electrostatic powder spray equipment may be used. The powder coating is applied electrostatically on the heat sensitive substrate suspended in the powder spray station, either with corona discharge spray guns, as are described above, or tribocharge spray guns, as are well known in the art. Tribocharging spray guns use frictional electricity to charge the powder. In triboguns, the powder coating particles are caused to rub against a friction surface of polytetrafluoroethylene, i.e., Teflon®, and are given an electrostatic charge which is opposite in polarity to the charge of the friction surface. A plurality of triboguns are preferably situated in the spray station. As the substrate travels into the spray station, the aforesaid low temperature cure thermosetting powder coating compositions of the present invention are electrostatically spray coated onto the substrate.

The heat sensitive substrate may also be preheated above ambient temperature prior to electrostatic deposition. Preferably, the heat sensitive board is preheated to temperatures in the range between about 150° and 300° F., and more preferably between about 180° and 250° F. Preheating is advantageous for improved smoothness.

After spraying, the charged powder adheres to the substrate for a period generally sufficient to permit conveying the coated heat sensitive article to an oven to melt and cure the powder into a uniform, continuous film having the desired characteristics bound to the substrate. The powder coatings of this invention are preferably cured on the wood articles and other heat sensitive articles in the oven along the cure time/temperature range of from about 60 seconds or less at about 300° F. peak substrate temperature down to about 20 minutes at about 200° F. peak substrate temperature. In a commercial horizontal line, where conveyor speed is important and rapid cures are desired (typically in a range less than 2 minutes), the powder coating of the present invention has the unique ability to provide rapid cures at especially low cure temperatures of about or below 300° F. for heat sensitive substrates. Wood coatings are typically applied in an effective amount to produce continuous dry films having a thickness between about 2 and 20 mils thick, and preferably between about 4 and 6 mils thick.

It should be understood that many other substrates, such as glass, ceramic, graphite and the like, can be coated with the thermosetting powder coating of this invention.

The invention will be further clarified by a consideration of specific examples which are intended to be purely exemplary of the invention.

EXAMPLES 1 TO 5

Cathodic Disbondment Resistant, Flexible, Rapid Curing, Epoxy Powder Coatings For Powder Coating On Rebars, Pipelines, And Other Metal Substrates Table 1 below illustrates the preparation of flexible, rapid curing, superior cathodic disbondment resistant, thermosetting epoxy powder coating compositions of the present invention having curing agent levels progressively below 70% stoichiometry, that are suitable for fusion coating on rebars, pipelines, and other metallic substrates. Table 1 also illustrates the preparation of a "Prior Art" epoxy powder coating composition having a curing agent level at 70% stoichiometry for comparative purposes.

TABLE 1

| | Parts Per Hundred Epoxy Resin (Phr) | | | | | |
|---|---|---|---|---|---|---|
| | Prior | Example | | | | |
| Ingredients | Art | 1 | 2 | 3 | 4 | 5 |
| HAND BLEND | | | | | | |
| Araldite ® GT 7074[1] | 92 | 92 | 92 | 92 | 92 | 92 |
| Araldite ® GT 7226[2] | 8 | 8 | 8 | 8 | 8 | 8 |
| Epon ® P-101[3] | 7 | 7 | 7 | 7 | 7 | 7.5 |

TABLE 1-continued

| | Parts Per Hundred Epoxy Resin (Phr) | | | | | |
|---|---|---|---|---|---|---|
| | Prior | Example | | | | |
| Ingredients | Art | 1 | 2 | 3 | 4 | 5 |
| D.E.H. ™ 87[4] | 26 | 24.2 | 22.3 | 18.6 | 11.2 | 9.3 |
| TY-70 Yellow[5] | 1 | 1 | 1 | 1 | 1 | 1 |
| BK-5099[6] | 0.02 | 0.02 | 0.02 | 0.02 | 0.02 | 0.02 |
| TiPure ® R-902[7] | 6 | 6 | 6 | 6 | 6 | 6 |
| 300 Green[8] | 4 | 4 | 4 | 4 | 4 | 4 |
| Cab-O-Sil ® M5[9] | 2.5 | 2.5 | 2.5 | 2.5 | 2.5 | 2.5 |
| Stoichiometry, % | 70% | 65% | 60% | 50% | 30% | 25% |
| CHARGE TO EXTRUDER AND EXTRUDE TO SHEETS AIR COOL AND BREAK INTO CHIPS AND THEN ADD | | | | | | |
| Cab-O-Sil ® M5 | 0.5 | 0.5 | 0.5 | 0.5 | 0.5 | 0.5 |
| CHARGE TO MILL AND GRIND TO POWDER AT HIGH SPEED SCREEN TO −100 MESH | | | | | | |
| Modulus[10] (Max G, psi) | 100 | 100 | 135 | 160 | 220 | 220 |

[1]Araldite ® GT 7074 is a diglycidyl ether of bisphenol A epoxy resin with a weight per epoxide of between 935 and 1,175 that is commercially available from Ciba-Geigy Corporation.
[2]Araldite ® GT 7226 is a master batch epoxy resin containing 90 wt. % of a diglycidyl ether of bisphenol A epoxy resin with a weight per epoxide of between 795 and 895 and 10 wt. % of Acronal ® 4F acrylic flow modifier, which master batch is commercially available from Ciba-Geigy Corporation.
[3]Epon Curing Agent ® P-101 is an imidazole adduct with a diglycidyl ether of bisphenol A epoxy resin that is commercially available from Shell Chemical Company.
[4]D.E.H. ™ 87 is a bisphenol A endcapped diglycidyl ether of bisphenol A, that has a hydroxy equivalent weight between 370 and 400 and that is commercially available from Dow Chemical Company.
[5]TY-70 Yellow is a yellow nickel titanate pigment that is commercially available from Ishihara Corp.
[6]BK-5099 is a black iron oxide pigment that is commercially available from E. W. Kaufmann Co.
[7]TiPure ® R-902 is a white titanium dioxide pigment that is commercially available from DuPont.
[8]300 Green is a green chromium oxide pigment that is commercially available from Landers Segal.
[9]Cab-O-Sil ® M5 is a fumed silica that is commercially available from Cabot Corporation.
[10]The modulus is measured with a melt rheometer which provides a measurement of the crosslink density of the cured composition in terms of psi. The higher the modulus value, the higher the degree of crosslink density.

The epoxy powder coating compositions listed in Table 1 were then powdery spray coated on steel panels or rebar that were previously grit blasted. The powder coating operation involved about a 450° F. preheat of the panel for about 20 minutes, a fluidized bed dip of the hot panel into the epoxy powder coating or electrostatic spray of a hot rebar with the powder, an air hang for about 30 seconds, a water quench for about 5 seconds, and an air hang to ambient. The cured coating thickness on each part was around 9–10 dry mills. The cured coatings were then subject to performance tests and the test results are listed below in Table 2.

TABLE 2

| | Test Results | | | | | |
|---|---|---|---|---|---|---|
| | | Example | | | | |
| Test | Prior Art | 1 | 2 | 3 | 4 | 5 |
| Cathodic Disbondment[1] | >4 mm | >4 | >4 | <2 | <1 | <0.5 |
| MEK Resistance[2] (50 double rubs) | 5 | 5 | 5 | 5 | 5 | 5 |

TABLE 2-continued

| | | | Test Results | | | |
|---|---|---|---|---|---|---|
| | | | | Example | | |
| Test | Prior Art | 1 | 2 | 3 | 4 | 5 |
| Direct Impact | 160 | 160 | 160 | 160 | 160 | 160 |
| 4" Mandrel Flexibility | Pass | Pass | Pass | Pass | Pass | Pass |
| Salt Spray | <3 mm | <3 | <3 | <3 | <3 | <3 |
| Stoichiometry | 70% | 65% | 60% | 50% | 30% | 25% |
| Modulus (Max G, psi) | 100 | 100 | 135 | 160 | 220 | 220 |

[1] Cathodic disbondment was measured by MTO Laboratory Test Method LS-420 entitled Cathodic Disbondment Test For Epoxy-Coated Reinforcing Bars dated 94 07 01.
[2] MEK resistance ranges from 5 = No Effect down to 1 = Rub Through.

EXAMPLES 6 TO 8

Low Temperature Curing/Rapid Curing Epoxy Powder Coatings For Electrostatic Powder Spray Coating On Wood and Heat Sensitive Substrates Table 3 below illustrates the preparation of superior low temperature curing or superior rapid curing thermosetting epoxy powder coating compositions of the present invention that are suitable for electrostatic powder spray coating of wood and other heat sensitive substrates.

TABLE 3

| | | Phr | |
|---|---|---|---|
| | | Example | |
| Ingredients | 6 | 7 | 8 |
| HAND BLEND | | | |
| Araldite ® GT 7074 | 46 | 46 | 46 |
| Araldite ® GT 7013[1] | 46 | 46 | 46 |
| Araldite ® GT 7226 | 8 | 8 | 8 |
| Epon ™ P-101 | 6 | 6 | 6 |
| D.E.H. ™ 87 | 23.1 | 23.1 | 23.1 |
| Color | Black | Green | White |
| Stoichiometry, % | 50 | 50 | 50 |
| CHARGE TO EXTRUDER AND EXTRUDE TO SHEETS AIR COOL AND BREAK INTO CHIPS AND THEN ADD | | | |
| Cab-O-Sil ® M5 | 0.4 | 0.4 | 0.4 |
| CHARGE TO MILL AND GRIND TO POWDER AT HIGH SPEED AND SCREEN TO −140 MESH | | | |

[1] Araldite ® GT 7013 is a diglycidyl ether of bisphenol A epoxy resin with a weight per epoxide of between 650 and 725 that is commercially available from Ciba-Geigy Corporation.

The epoxy powder coating compositions listed in Table 3 were then powder spray coated on wood boards. The powder coating operation involved electrostatically spraying with triboguns or corona guns the powders onto the wood boards. The coated boards were then baked to cure in an infrared oven at cure temperatures of about 300° F. peak substrate temperature for about 60 seconds. The cured coating thickness on each board was around 6 dry mils. Some boards were preheated prior to powder spraying to improve smoothness of the cured coating. The electrostatic spray processing conditions and final properties for the formulation of Examples 6 are listed below in Table 4.

TABLE 4

| | Example | | | | |
|---|---|---|---|---|---|
| | 6 | 6 | 6 | 6 | 6 |
| Process Conditions | Electrostatic Triboelectric Powder Spray Coating | | | | |
| Substrate Type | PB | MDF | MDF | MDF | MDF |
| Preheat. °F. | None | 186 | 250 | 280 | 300 |
| Peak Temp., °F. | 220 | 255 | 300 | 310 | 320 |
| Cure Time, min. | 2.4 | 1.2 | 0.8 | 0.6 | 0.24 |
| Tests | Test Results | | | | |
| MEK Resistance[1] (50 Double Rubs) | 3 | 5 | 5 | 5 | 5 |
| Appearance | Rough | MOP | SOP | SOP | MOP |
| Pinholes | Yes | No | No | No | No |
| Film Thickness, mils | 5–6 | 5 | 5–6 | 6–7 | 5 |

[1] MEK resistance ranges from 5 = No Effect down to 1 = Rub Through.

EXAMPLE 9

Disbondment Resistant, Smooth, Flexible, Rapid Curing, Epoxy Powder Coatings For Powder Coating On Steel Strappings And Other Uncleaned Metal Substrates Table 5 below illustrates the preparation of a flexible, smooth, rapid curing, thermosetting epoxy powder coating composition of the present invention having curing agent levels below 70% stoichiometry that exhibit superior adhesion to unclean, oily and scaly surfaces, and that are suitable for fusion coating on steel strappings and other metallic substrates that are uncleaned prior to coating.

TABLE 5

| Ingredients | Phr Example 9 |
|---|---|
| HAND BLEND | |
| Araldite ® GT 7013 | 100 |
| Epon ® P-101 | 5.4 |
| D.E.H. ™ 87 | 27.2 |
| Resiflow P67[1] | 2.2 |
| Raven 1255[2] | 3.3 |
| Stoichiometry, % | 48 |
| CHARGE TO EXTRUDER AND EXTRUDE TO SHEETS AIR COOL AND BREAK INTO CHIPS AND THEN ADD | |
| Cab-O-Sil ® M5 | 0.4 |
| CHARGE TO MILL AND GRIND TO POWDER AT HIGH SPEED AND SCREEN TO −200 MESH | |

[1] Resiflow P67 is an acrylic flow aid that is a polyacrylate, 2-propenoic acid ethyl ester polymer, that is commercially available from Estron Chemical.
[2] Raven 1255 is a carbon black pigment that is commercially available from Columbian Chemical.

The epoxy powder coating composition listed in Table 5 was then cold electrostatic powder spray coated onto steel strappings that were not previously cleaned. After cold spray, the coated substrate was next heat cured at about 550° F. peak substrate temperature for about 2.5 seconds to melt, flow and cure the powder into smooth hardened film, water quenched, and collected on a take-up reel. The cured film thickness on the strapping was about 1.5 mils. The cured coating was then subject to performance tests and the test results are listed below in Table 6.

TABLE 6

| Test | Example 9 |
|---|---|
| MEK Resistance (50 double rubs) | 5 |
| Direct Impact (in lbs.) | 160 |
| Salt Spray (1000 hrs.) undercut | 1/16 in |
| Stoichiometry | 48% |
| Modulus (Max G, psi) | 128 |

EXAMPLES 10 TO 12

Cathodic Disbondment Resistant, Flexible, Rapid Curing, Epoxy Powder Coatings For Powder Coating On Rebars, Pipelines, And Other Metal Substrates Table 7 below illustrates the preparation of flexible, rapid curing, superior cathodic disbondment resistant, thermosetting epoxy powder coating compositions of the present invention having curing agent levels progressively below 70% stoichiometry, that are suitable for fusion coating on rebars, pipelines, and other metallic substrates.

TABLE 7

| | Example | | |
|---|---|---|---|
| Ingredients | 10 | 11 | 12 |
| HAND BLEND | | | |
| Araldite ® GT 7074 | 92 | 92 | 92 |
| Araldite ® GT 7226 | 8 | 8 | 8 |
| Epon ® P-101 | 5 | 5 | 5 |
| D.E.H. ™ 85[1] | 14.7 | 9.9 | 4.9 |
| TY-70 Yellow | 1 | 1 | 1 |
| BK-5099 | 0.02 | 0.02 | 0.02 |
| TiPure ® R-902 | 6 | 6 | 6 |
| 300 Green | 4 | 4 | 4 |
| Cab-O-Sil ® M5 | 2.5 | 2.5 | 2.5 |
| Stoichiometry, % | 60% | 40% | 20% |
| CHARGE TO EXTRUDER AND EXTRUDE TO AIR COOL AND BREAK INTO CHIPS AND THEN | | | |
| Cab-O-Sil ® M5 | 0.5 | 0.5 | 0.5 |
| CHARGE TO MILL AND GRIND TO POWDER AT SCREEN TO −100 MESH | | | |
| Modulus (Max G, psi) | 144 | 203 | 262 |

[1]D.E.H. ™ 85 is a bisphenol A endcapped diglycidyl ether of bisphenol A, that has a hydroxy equivalent weight between 240 and 270 and that is commercially available from Dow Chemical Company.

The epoxy powder coating compositions listed in Table 7 were then powder spray coated on steel panels or rebar that were previously grit blasted. The powder coating operation involved about a 450° F. preheat of the panel for about 20 minutes, a fluidized bed dip of the hot panel into the epoxy powder coating or electrostatic spray of a hot rebar with the powder, an air hang for about 30 seconds, a water quench for about 5 seconds, and an air hang to ambient.

The cured coating thickness on each part was around 9–10 dry mils. The cured coatings were then subject to performance tests and the test results are listed below in Table 8.

TABLE 8

| | Example | | |
|---|---|---|---|
| Test | 10 | 11 | 12 |
| Cathodic Disbondment | <4 | <4 | <4 |
| MEK Resistance (50 double rubs) | 5 | 5 | 5 |
| Direct Impact | 160 | 160 | 160 |
| 4" Mandrel Flexibility | Pass | Pass | Pass |
| Stoichiometry | 60% | 40% | 20% |
| Modulus (Max G, psi) | 144 | 203 | 262 |

The invention having been disclosed in the foregoing embodiments and examples, other embodiments of the invention will be apparent to persons skilled in the art. The invention is not intended to be limited to the embodiments and examples, which are considered to be exemplary only. Accordingly, reference should be made to the appended claims to assess the true spirit and scope of the invention, in which exclusive rights are claimed.

The subject matter claimed is:

1. A thermosetting epoxy powder coating composition, which is a composition in particulate form that comprises a blend of:
   (a) an epoxy resin comprising a diglycidyl ether of bisphenol A having a weight per epoxide between about 700 and about 2,000;
   (b) a curing agent for said epoxy resin comprising a bisphenol A endcapped diglycidyl ether of bisphenol A having a hydroxy equivalent weight between about 180 and about 450; and,
   (c) a cure catalyst,
in which the stoichiometry of said curing agent to said epoxy resin is provided in an effective amount at or below about 60% stoichiometry.

2. The composition of claim 1, in which said stoichiometry is between about 10% and about 60% stoichiometry.

3. The composition of claim 2, in which said stationary is between about 20% and about 50% stoichiometry.

4. The composition of claim 1, in which said epoxy resin has a weight per epoxide between about 795 and 1,175.

5. The composition of claim 1, in which said curing agent has a hydroxy equivalent weight between about 370 and about 400.

6. The composition of claim 1, in which said cure catalyst is selected from an imidazole or an imidazole adduct with a diglycidyl ether of bisphenol A.

7. The composition of claim 1, which further comprises:
   (d) pigments; and,
   (e) a powder flow modifier.

8. A thermosetting epoxy powder coating composition, which is a composition in particulate form that comprises a blend of:
   (a) an epoxy resin comprising a diglycidyl ether of bisphenol A having a weight per epoxide between about 700 and 1,200;
   (b) a curing agent for said epoxy resin comprising a bisphenol A endcapped diglycidyl ether of bisphenol A having a hydroxy equivalent weight between about 350 and 450; and,
   (c) from about 4 to about 10 phr of a cure catalyst comprising an imidazole adduct with a diglycidyl ether of bisphenol A;
   (d) up to about 60 phr of pigments;

(e) up to about 2 phr of an acrylic flow modifier;

(f) up to about 4 phr of a fumed silica; and, (g) up to about 100 phr of a filler, in which the stoichiometry of said curing agent to said epoxy resin is provided in an effective amount at or below about 60% stoichiometry.

9. The composition of claim 8, in which said stoichiometry is between about 10 and about 60% stoichiometry.

10. The composition of claim 9, in which said stoichiometry is between about 20% and about 50% stoichiometry.

11. The composition of claim 9, in which said epoxy resin has a weight per epoxide between about 795 and about 1,175.

12. The composition of claim 11, in which said curing agent has a hydroxy equivalent weight between about 370 and about 400.

13. The composition of claim 12, in which said composition has a cathodic disbondment when cured of less than about 4 mm radius of disbondment.

14. The composition of claim 13, in which said contagious has a cathodic disbondment when cured of less than about 2 mm radius of disbondment.

15. The composition of claim 12, in which said composition has a cure time/temperature range of from about 30 seconds at about 400°–450° F. peak substrate temperature down to about 20 minutes at about 180°–200° F. peak substrate temperature.

16. A substrate having the thermosetting epoxy powder coating composition of claim 1 powder coated and cured thereon.

17. The coated substrate of claim 16, in which said substrate is a metal.

18. The coated substrate of claim 17, in which said coated substrate has a cathodic disbondment of less than about 2 mm radius of disbondment.

19. The coated substrate of claim 16, in which said substrate is heat sensitive.

20. The coated substrate of claim 19, in which said substrate comprises wood.

21. A thermosetting epoxy powder coating composition, which is a composition in particulate form that comprises a blend of:

(a) an epoxy resin which is a diglycidyl ether of a dihydric phenol having a weight per epoxide between about 650 and about 2,000;

(b) a phenolic curing agent for said epoxy resin which is a bisphenol A endcapped diglycidyl ether of bisphenol A having a hydroxy equivalent weight between about 180 and about 450; and, (c) an effective amount of a cure catalyst which is selected from the group consisting of an imidazole and an imidazole adduct with a diglycidyl ether of bisphenol A, in which the stoichiometry of said curing agent to said epoxy resin is provided in an effective amount at or below about 60% stoichiometry.

22. The composition of claim 21, in which said stoichiometry is between about 10% and about 60% stoichiometry.

23. The composition of claim 22, in which said stoichiometry is between about 20% and about 50% stoichiometry.

24. The composition of claim 23, in which said stoichiometry is between about 25% and about 35% stoichiometry.

25. The composition of claim 21, in which said epoxy resin is a diglycidyl ether of bisphenol A.

26. The composition of claim 21, in which said epoxy resin has a weight per epoxide between about 900 and about 1,200 and said phenolic curing agent has a hydroxy equivalent weight between about 350 and 450.

27. The composition of claim 25, in which said cure catalyst is a 2-methylimidazole adduct of diglycidyl ether of bisphenol A.

28. The composition of claim 25, in which said cure catalyst is 2-methylimidazole.

29. The composition of claim 21, which further comprises:

(d) pigments;

(e) an acrylic flow modifier; and (f) fumed silica.

30. A substrate having the thermosetting epoxy powder coating of claim 21 powder coated and cured thereon.

31. The coated substrate of claim 30, in which said substrate is metallic.

32. The coated substrate of claim 31, in which said metallic substrate is a steel strapping.

33. The coated substrate of claim 30, in which said substrate is a heat sensitive substrate.

34. The coated substrate of claim 33, in which said heat sensitive substrate comprises wood.

35. A method of powder coating, which comprises:

a) electrostatically applying a thermosetting epoxy powder coating composition partially or completely over steel strapping at ambient temperature, in which said composition is in particulate form and comprises a blend of:

i) an epoxy resin which is a diglycidyl ether of a dihydric phenol having a weight per epoxide between about 650 and about 2,000;

ii) a phenolic curing agent for said epoxy resin which is a bisphenol A endcapped diglycidyl ether of bisphenol A having a hydroxy equivalent weight between about 180 and about 450; and, iii) an effective amount of a cure catalyst which is selected from the group consisting of an imidazole and an imidazole adduct with a diglycidyl ether of bisphenol A, in which the stoichiometry of said curing agent to said epoxy resin is provided in an effective amount at or below about 60% stoichiometry;

b) heating said steel strapping to a substrate temperature sufficient to melt, flow and cure said composition over said steel strapping and form a smooth, dry, continuous film finish thereon; and, c) cooling said steel strapping to ambient temperature.

36. The method of claim 35, in which stoichiometry is between about 10 and about 60% stoichiometry.

37. The method of claim 36, in which said epoxy resin has a weight per epoxide between about 650 and about 1,200.

38. The method of claim 37, in which said phenolic curing agent has a hydroxy equivalent weight between about 200 and about 450.

39. The method of claim 38, in which said cure catalyst is a 2-methylimidazole adduct of diglycidyl ether of bisphenol A.

40. The method of claim 39, in which said epoxy resin is a diglycidyl ether of bisphenol A.

* * * * *

UNITED STATES PATENT AND TRADEMARK OFFICE
CERTIFICATE OF CORRECTION

PATENT NO. : 5,686,185
DATED : November 11, 1997
INVENTOR(S) : Correll et al.

It is certified that error appears in the above-indentified patent and that said Letters Patent is hereby corrected as shown below:

*Column 1, line 27, after "heat" insert --sensitive--.*
*Column 3, line 60, "imidazoles" should be --imidazole-- (second occurrence).*

*Column 12, line 63, "Tribocharging" should be --Tribocharge--.*
*Column 18, line 40, "stationary" should be "stoichiometry--.*

Signed and Sealed this

Twenty-seventh Day of October, 1998

Attest:

BRUCE LEHMAN

*Attesting Officer*   Commissioner of Patents and Trademarks